(12) United States Patent
Kim et al.

(10) Patent No.: US 7,321,595 B2
(45) Date of Patent: Jan. 22, 2008

(54) METHOD FOR PROCESSING VARIOUS NUMBERS OF PORTS IN NETWORK PROCESSOR

(75) Inventors: Su-Hyun Kim, Seoul (KR); Young-Seok Kim, Songnam-shi (KR); Young-Il Kim, Yongin-shi (KR); Jong-Sang Oh, Suwon-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1008 days.

(21) Appl. No.: 10/436,104

(22) Filed: May 13, 2003

(65) Prior Publication Data

US 2003/0219027 A1 Nov. 27, 2003

(30) Foreign Application Priority Data

May 25, 2002 (KR) ...................... 10-2002-0029122

(51) Int. Cl.
*H04L 12/56* (2006.01)
(52) U.S. Cl. ...................................... 370/416
(58) Field of Classification Search ................. 370/419
See application file for complete search history.

(56) References Cited

U.S. PATENT DOCUMENTS 5,014,193 A * 5/1991 Garner et al. ................ 710/10
5,809,527 A 9/1998 Cooper et al.
6,078,964 A 6/2000 Ratcliff et al.
2004/0202192 A9 * 10/2004 Galbi et al. ................. 370/412

OTHER PUBLICATIONS

Gebotys, Catherine, "DSP Address Optimization Using A Minimum Cost Circulation Technique," Proceedings of the 1997 IEEE/ACM international conference on Computer-aided design, San Jose, CA, 1997.*
Leser, Norbert, "Towards a Worldwide Distributed File System," Open Software Foundation, Sep. 27, 1990.*
Shah, Niraj, "Understanding Network Processors," Version 1.0, Sep. 4, 2001.*

* cited by examiner

*Primary Examiner*—Chau Nguyen
*Assistant Examiner*—Christopher Gray
(74) *Attorney, Agent, or Firm*—Robert E. Bushnell, Esq.

(57) ABSTRACT

A method for processing various numbers of ports in a network processor. A method for processing various numbers of ports in a network processor comprises the steps of: a) receiving the number N of ports from a system controller; b) allocating N−1 number of registers for storing N−1 number of port management information in response to the number N of ports; c) processing a packet by sequentially accessing the N number of ports; and d) after processing a packet related to a predetermined port, storing management information related to the predetermined port in a register used for the next port, and storing the management information related to the predetermined port in a first register among the N−1 number of registers when a register for storing management information in a previous packet processing is the last (N−1)-th register among the N−1 number of registers.

13 Claims, 5 Drawing Sheets

```
N= 4*N 4:/* 4*N :# OF PORT WHICH IS RECOGNIZED AUTOMATICALLY */
PORT = 0;/* INITIAL VALUE OF PORT OF 1ST THREAD */
TOKEN =1;/* INITIAL VALUE OT THE TOKEN */
4N_EXTENSION:
FUNCTION 1
IF(TOKEN ==1){
EXCHANGE(PORTINFO_0,PACKET_BUF_ADDR);
EXCHANGE(PORTINFO_1,(EXCEPTION<<16) II PACKET_SIZE);
TOKEN = 2;
}
ELSE IF(TOKEN == 2){
EXCHANGE(PORTINFO_2,PACKET_BUF_ADDR);
EXCHANGE(PORTINFO_3(EXCEPTION<<16) II PACKET_SIZE);
TOKEN = 3;
}
...
ELSE IF(TOKEN == N-2){
EXHANGE(PORTINFO_(N-3)*2,PACKET_BUF_ADDR);
EXCHANGE(PORTINFO_((N-3)*2+1),(EXCEPTION<<16) II PACKET_SIZE);
TOKEN = N-1;
}
ELSE {/* TOKEN == N-1 */
EXCHANGE(PORTINFO_(N-1)*2,PACKET_BUF_ADDR);
EXCHANGE(PORTINFO_((N-1)*2 + 1),(EXCEPTION<<16) II
PACKET_SIZE);
TOKEN = 1;
}
FUNCTION 2
PORT = PORT +4;/* SEQUENTIALLY ASSIGN PORTS OF A THREAD */
IF(PORT >= 4*N)
PORT = PORT & 3;
FUNCTION 3
IF(CHECK(PORT))/* CHECK WHETHER THE SELECTED PORT RECEIVES A PACKET
OR NOT. */
PACKET_PROESSING(PORT);/* CONTINUE TO PROCESS THE RECEIVED
PACKET */
ELSE
GOTO 4N_EXTENSION;
...
PACKET_PROCESSING(PORT){
...
}
```

FIG.5

METHOD FOR PROCESSING VARIOUS NUMBERS OF PORTS IN NETWORK PROCESSOR

CLAIM OF PRIORITY

This applicaton makes reference to, incorporates the same herein, and claims all benefits accruing under 35 U.S.C. §119 from my application METHOD FOR PROCESSING VARIABLE NUMBER OF PORTS IN NETWORK PROCESSOR filed with Korean Industrial Property Office on May 25, 2002 and there duly assigned Serial No. 29122/2002.

BACKGROUND OF THE INVENTION

1. Technical Field

The present invention relates to a network processor, and more particularly to a method for processing various numbers of ports in a network processor.

2. Related Art

In recent times, Internet subscribers (called "netizens") have increased rapidly, and further, a new Internet service such as integration between voice and data and integration between the wired/wireless Internets, etc. has become increasingly popular as a substitute for a typical Internet service. To accomplish this new Internet service, a typical network system must be newly upgraded to have more intelligence and be operated at a super-high speed. To support such a system, a packet-processing fundamental component having a wide bandwidth is indispensable. However, since a typical ASIC (Application Specific Integrated Circuit)-based network equipment used for an Internet uses a silicon chip, it is impossible to add a new function or enhance its existing performance, and its packet-processing capacity is limited within a predetermined range. Therefore, network equipment based on the next generation silicon chip may be being developed.

Generally, a network processor (NP) is a kind of a programmable processor that is capable of processing a packet in various methods before transmitting the packet received at an input user interface (i.e., an input port) to an output user interface (i.e., an output port), and is a specific packet processor having advantages in that it provides a high-performance packet-processing capacity and immediately reflects various desires of network users by means of a program.

The network processor is a non-memory semiconductor serving as fundamental components for the next generation network equipment. The non-memory semiconductor performs a traffic transmission between ports in network equipment such as a router and switch, and performs a programming for an intelligent switching function in such a way that various kinds of multimedia Internet traffic services are available. Therefore, many manufacturers of communication chips have developed such a network processor in light of "cost-effective" and "time-to-market" products. For example, representative manufacturers, such as an Intel, IBM, Vitesse, and AMCC Corporations, etc., have competed with one another to develop a new network processor and an enhanced version.

In the meantime, many companies developing network equipment using the aforementioned network processor have considered a type of user interfaces, the number of user interfaces, and a speed of user interfaces as the most important matters. For example, there are various kinds of user interfaces, that is, T1, E1, Fast Ethernet, Gigabit Ethernet, OC-3, OC-12, and OC-48, etc. A program in a typical network processor has a fixed program structure in that a fixed number of ports are supported by a given user interface type or a hardware designer. For example, in case of a system supporting Fast Ethernet user interface 16-ports, a system designer develops a fixed-structure program for processing input packets received from the 16 ports.

In this case, a program designer is capable of maximizing a program performance after fixing a program structure. However, in case of changing the number of ports, the program designer must develop other programs due to a problem of a network processor. That is, in the case where a network processor has a wrong structure or a wrong program while making its own internal program, it does not reuse a program or degrades a program extension even though it is a programmable processor.

For example, an "IXP1200" manufactured by the Intel Corporation is a network processor for a packet processing, and has a "Layer 2 switching" function and a "Layer 3 routing" function. In the future, the IXP1200 will provide various kinds of functions, e.g., a traffic engineering, QoS (Quality of Service), MPLS (Multi-Protocol Label Switching), and ATM (Asynchronous Transfer Mode), etc., that are useful to a communication circuitry field. However, for a microcode structure (e.g., an Intel network processor program) of the IXP1200, it is difficult to extend the number of ports, because it processes a fixed number of ports in consideration of a processing performance of the IXP1200 or allocates a predetermined port to a microengine (e.g., an IXP1200's packet processing engine).

Exemplars of recent efforts in the art of networking are disclosed, for example, in U.S. Pat. No. 6,078,964 to Ratcliff et al. entitled ESTABLISHING DIRECT COMMUNICATIONS BETWEEN TWO HOSTS WITHOUT USING A HIGH PERFORMANCE LAN CONNECTION, issued on Jun. 20, 2000, and U.S. Pat. No. 5,809,527 to Cooper et al., entitled OUTBOARD FILE CACHE SYSTEM, issued on Sep. 15, 1998.

While these contemporary efforts contain merit, it is our observation that further improvements can also be contemplated.

In conclusion, in the case where extending the number of ports is needed depending on the type of user interfaces or the designer's intention, the microcode structure must be changed so that the whole code must be changed too. Also, in case of various user interfaces, the designer must develop many microcode sets to satisfy all the user interfaces.

SUMMARY OF THE INVENTION

Therefore, the present invention has been made in view of the above problems, and the present invention provides a method for extending the number of user interfaces in a network processor.

The present invention provides a method for processing various numbers of ports in a network processor.

In accordance with one aspect of the present invention, the present invention provides a method for processing various numbers of ports in a network processor, comprising the steps of a) receiving the number N of ports from a system controller; b) allocating N−1 number of registers for storing N−1 number of port management information in response to the number N of ports; c) processing a packet by sequentially accessing the N number of ports; and d) after processing a packet related to a predetermined port, storing management information related to the predetermined port in a register used for the next port, and storing the management information related to the predetermined port in a first register among the N−1 number of registers when a register for storing management information in a previous packet processing is the last (N−1)-th register among the N−1 number of registers.

In accordance with the principles of the present invention, as embodied and broadly described, the present invention provides a method for processing various numbers of ports in a network processor, the method comprising: receiving a number N corresponding to a number of ports; allocating a plurality of registers for storing N−1 items of port management data, the plurality of registers corresponding to a number N−1 of registers, the N−1 registers including a first register and a last register, the last register corresponding to (N−1)th register; sequentially accessing the N ports to receive packets; processing a packet received from a predetermined port selected from among the N ports; and storing current management data in a selected one register selected from among the N−1 registers, the current management data corresponding to the predetermined port, the selected one register corresponding to a next port, the next port being selected from among the N ports and being the port accessed after the predetermined port is accessed; the selected one register corresponding to the first register when previous management data corresponds to a previous port selected from among the N ports, and the previous port was accessed before the predetermined port was accessed, and the previous management data was stored in a previous register, and the previous register corresponds to the (N−1)th register.

In accordance with the principles of the present invention, as embodied and broadly described, the present invention provides a method of selecting a register being using a token technique.

In accordance with the principles of the present invention, as embodied and broadly described, the present invention provides a method for processing ports at one thread in a network processor having a plurality of threads for processing a packet, each thread processing packets received from at least one port, the method comprising: allocating a plurality of registers for storing N−1 items of port management data, the plurality of registers corresponding to a number N−1 of registers, the N−1 registers including a first register and a last register, the last register corresponding to (N−1)th register, a number N corresponding to a number of ports processed at one thread; sequentially accessing the N ports including a predetermined port selected from among the N ports; processing a packet received from the predetermined port; and storing current management data in a selected one register selected from among the N−1 registers, the current management data corresponding to the predetermined port, the selected one register corresponding to a next port, the next port being selected from among the N ports and being the port accessed after the predetermined port is accessed; the selected one register corresponding to the first register when a previous register corresponds to the (N−1)th register, the previous register being one of the N−1 registers, the previous register storing previous management data before said storing of the current management data.

In accordance with the principles of the present invention, as embodied and broadly described, the present invention provides a method for processing various numbers of ports in a network processor, the method comprising: allocating a plurality of registers in dependence upon a number N of ports, the number of allocated registers being the number N−1; sequentially accessing the N ports to process a packet; receiving a packet from a predetermined port, the predetermined port being selected from among the N ports; sequentially selecting a register from among the N−1 registers with a circulation technique; and storing management data corresponding to the predetermined port in the selected register.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

FIG. 5 is a view showing a C-code program for implementing the processing procedure of FIG. 4, in accordance with the principles of the present invention.

DESCRIPTION OF EMBODIMENTS FOR CARRYING OUT THE INVENTION

Figure 1:
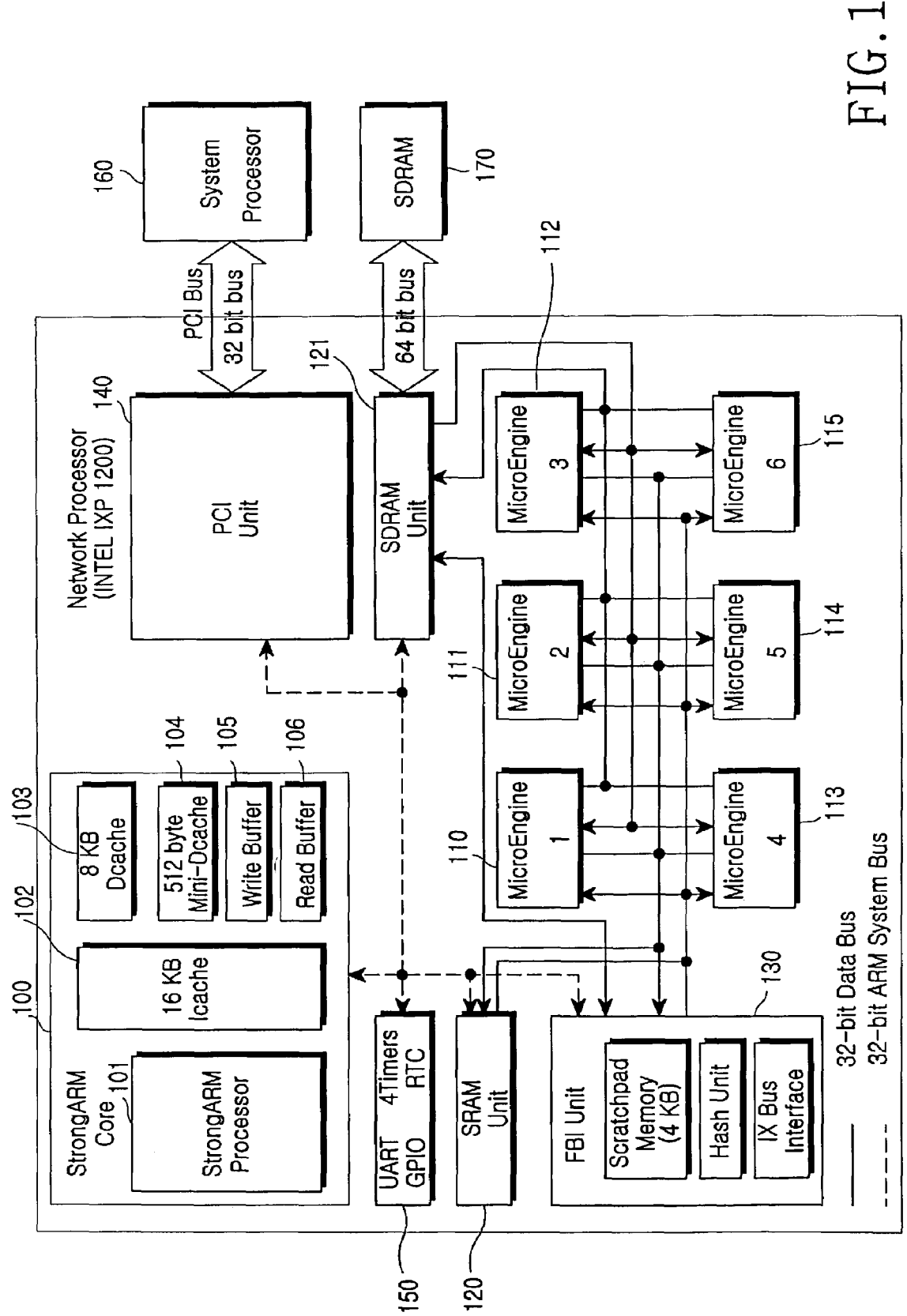
FIG. 1 is a block diagram of a network processor, in accordance with the principles of the present invention.

While the present invention will be described more fully hereinafter with reference to the accompanying drawings, in which details of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions, constructions, and configurations are not described in detail since they could obscure the invention with unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

The present invention is provided to support various kinds of user interfaces and various numbers of ports in a network processor. The network processor will hereinafter be described with reference to an "IXP1200" manufactured by Intel Corporation, which is one of commercial use network processors. While the present invention has been shown and described with respect to the particular embodiments, it will be apparent to those skilled in the art that many changes and modifications may be made without departing from the spirit and scope of the invention as defined in the appended claims.

FIG. 1 is a block diagram of a network processor, in accordance with the principles of the present invention. A configuration of FIG. 1 adopts "IXP1200" structure of Intel Corporation. As shown in FIG. 1, a network processor comprises a strongarm (SA) core 100 for processing a control packet and six microengines 110~115 for processing a data packet. Herein, the strongarm core 100 includes a strongarm processor 101 for controlling the whole operation of a network processor, a plurality of cache memories 102~104, and a plurality of buffers 105~106 for reading/writing data to be input or output. The SDRAM 170 is in communication with the SDRAM unit 121 through a 64 bit bus.

Besides the aforementioned components, the network processor further comprises SRAMs (Static Random Access Memories) 120~121 for accessing the strongarm core 100 along with the microengines 110~115; a first in first out (FIFO) bus interface (FBI) unit 130 for containing a scratchpad memory, a hash unit, and an IX (Internet exchange) bus interface; and a PCI (Peripheral Component Interconnect) unit 140 for communicating with external processors.

The strongarm core 100 communicates with a system processor 160 through a PCI bus. A user interface is connected to the IX bus interface through an IX bus. For example, the user interface may be freely selected from a Gigabit Ethernet to a T1 interface.

First, the strongarm core (also referred to as a controller) 100 acquires the type of user interfaces and the number of user interfaces from the system processor 160 via the PCI bus, and stores them in a SRAM 120 readable by the microengines (hereinafter referred to as data processors) 110~115. Then, the data processors 110~115 each read the information stored in the SRAM 120, and acquire the type and the number of user interface ports to be managed by each data processor.

A network processor comprises a strongarm core (also referred to as a processor) 100 for processing a control packet and six data processors 110~115 for processing a data packet. Each data processor is composed of four threads T1, T2, T3 and T4, and is operated at a zero context switching among threads in such a way that each thread has a unique resource.

Since one data processor is composed of four threads, ports contained in one data processor are uniformly divided into the four threads and then each thread processes divided ports. For example, provided that the number of ports is 4×N (N>=1, and N is the number of ports processed at one thread), this means that 4 threads each process at least one port.

The following TABLE 1 illustrates how a plurality of ports are divided into four threads.

TABLE 1

| Thread | Port | Representation |
| --- | --- | --- |
| T1 | P0, P4, P8, P12, ... | $4 \times n$ $[0 <= n <= (N - 1)]$ |
| T2 | P1, P5, P9, P13, ... | $4 \times n + 1$ $[0 <= n <= (N - 1)]$ |
| T3 | P2, P6, P10, P14, ... | $4 \times n + 2$ $[0 <= n <= (N - 1)]$ |
| T4 | P3, P7, P11, P15, ... | $4 \times n + 3$ $[0 <= n <= (N - 1)]$ |

As shown in the TABLE 1, a plurality of ports are uniformly divided and distributed over four threads T1~T4, and each thread manages the information of the corresponding ports. Provided that the port information is called management information, the management information is stored and managed in a corresponding relative register (RR) of each thread. There are various kinds of management information about ports, namely, a packet buffer address (packet_buf_addr), a packet size (packet_size), and exception process information (exception), etc. Two relative registers (RRs), i.e., a first register (portinfor_n) and a second register (portinfor_(n+1)), are managed by one port. The first register stores the packet buffer address, and the second register stores a packet size and the exception process information. Therefore, the number of management information pairs for N number of ports is N−1, because a current thread performs operation about a corresponding port.

Figure 2:
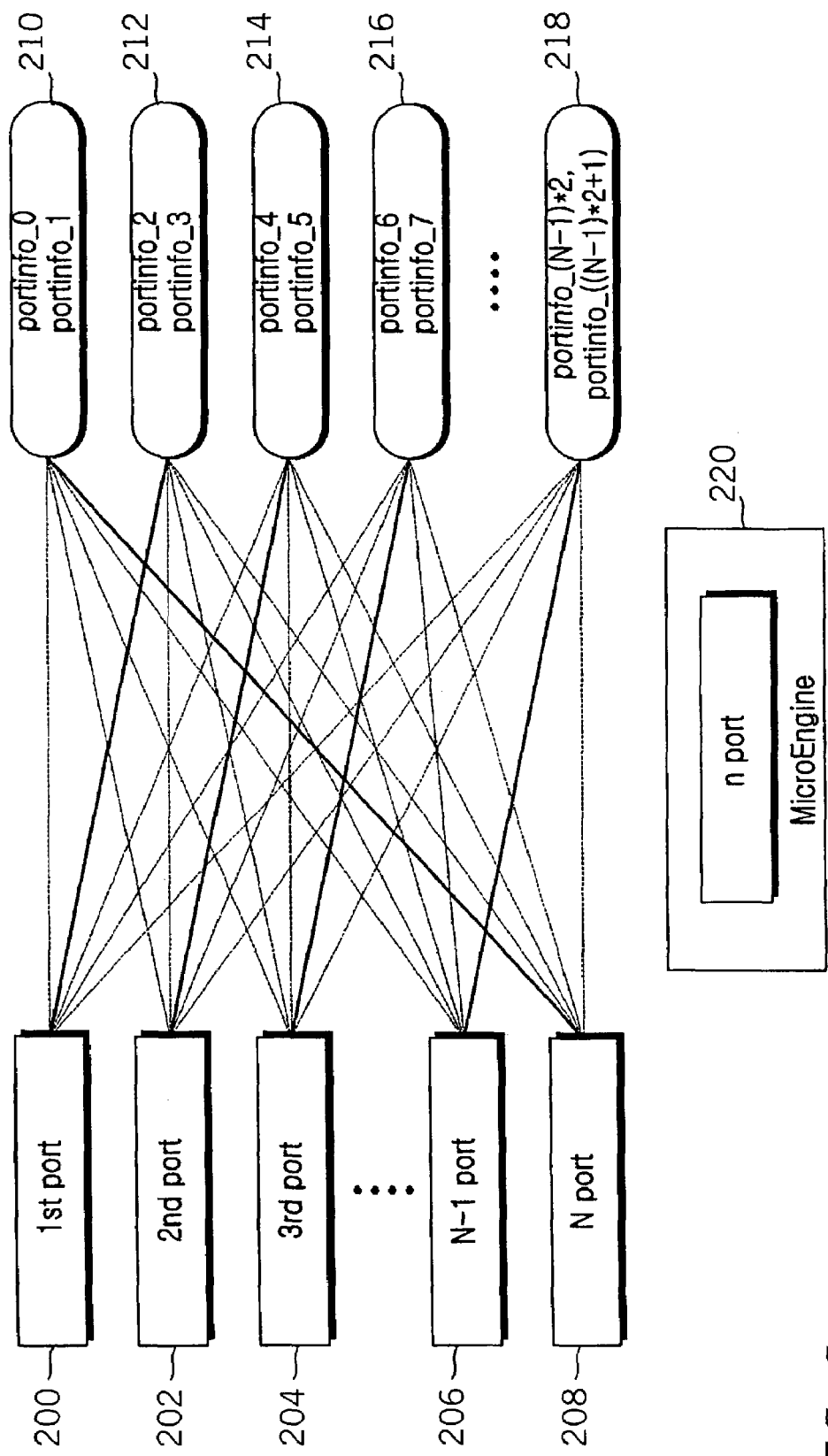
FIG. 2 is a view showing the relationship between ports and management information, in accordance with the principles of the present invention.

FIG. 2 is a view showing the relationship between ports and management information, in accordance with the principles of the present invention. The FIG. 2 shows ports 200~208, management information (also known as management data) 210~218, and microengine 220. The management data 210 shown in FIG. 2 can also be referred to as a pair of items of management data.

Herein, it is noted that there is no necessity for considering a specific register pair about a specific port, and the reason will be described later. Referring to FIG. 2, n port (1<=n<=N) means that n-th port is currently allocated to one thread of a data processor and performs a packet processing. And, thick solid lines in the relationship diagram between each port and each management information pair denote that the information of a corresponding port is currently stored and managed in a corresponding management information pair. Also, the dotted lines in the relationship diagram between them denote that the information of each port will be stored in a corresponding management information pair in the future. For example, in the case where the number of user interfaces (or the number of ports) is 16, the required operations are as follows.

Figure 3:
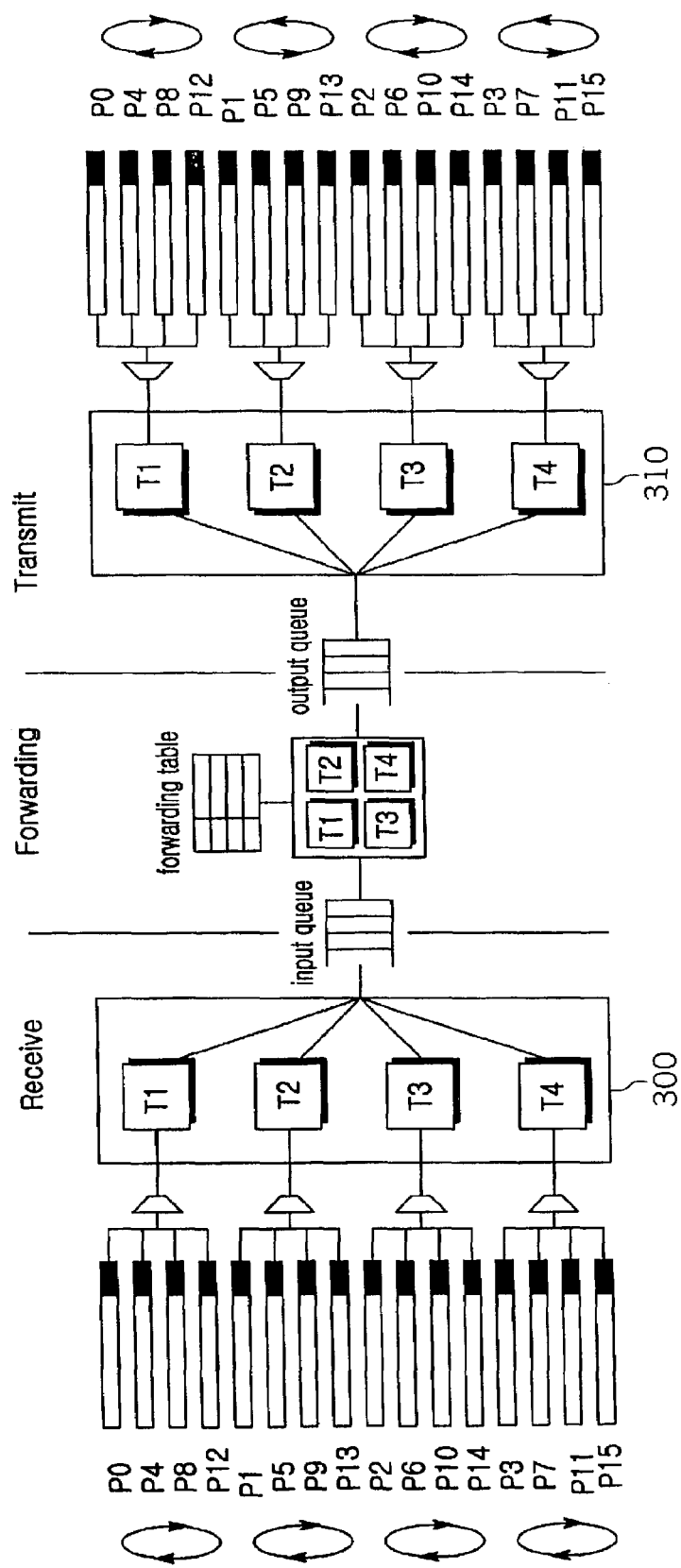
FIG. 3 is a view showing a processing structure for extending the number of user interfaces to 16 ports, in accordance with the principles of the present invention.

FIG. 3 is a view showing a processing structure for extending the number of user interfaces to 16 ports, in accordance with the principles of the present invention. With reference to FIG. 3, a packet processing is mostly divided into a receiving operation, a forwarding operation, and a transmitting operation. Six data processors can be respectively allocated to the receiving, forwarding, and transmitting operations, and the allocation is determined depending on an implementation method. FIG. 3 illustrates an example that I/O ports P0~P15 are processed in three data processors. Namely, as shown in FIG. 3, the receiving operation, the forwarding operation, and the transmitting operation are controlled by one data processor, respectively. In the case where a packet is processed by six data processors, two data processors may be assigned to each operation.

But, it is noted that the forwarding operation will not be discussed in detail in the present patent application. Also, the following description will hereinafter be described with reference to the receiving operation, because the receiving and transmitting operations are identical in their basic operation whereas they are different in their management information.

Firstly, a data processor 300 for the receiving operation is comprised of four threads T1~T4, and each thread processes four ports. A first thread T1 processes four ports P0, P4, P8 and P12, a second thread T2 processes four ports P1, P5, P9 and P13, a third thread T3 processes four ports P2, P6, P10 and P14, and a fourth thread T4 processes four ports P3, P7, P11 and P15. Herein, management information pairs operated at one thread are managed by tokens. That is, if the number of ports processed at one thread is N, a token value is sequentially managed from 1 to N−1. So, N−1 number of management information pairs about N number of ports operated at one thread are managed by the token value. The data processor 310 is for the transmitting operation.

The sequential management of the token value from 1 to N−1, described herein, can be referred to as a token method, a token technique, and a circulation technique. An algorithm for operating the management information pairs in association with the token will hereinafter be described in the following. The following algorithm is operated in the same manner in each of threads, but a port initiation value is different in terms of the threads. The steps shown in FIG. 4 describes an algorithm for incrementing the token numbers and for incrementing the port values, in accordance with the principles of the present invention.

Figure 4:
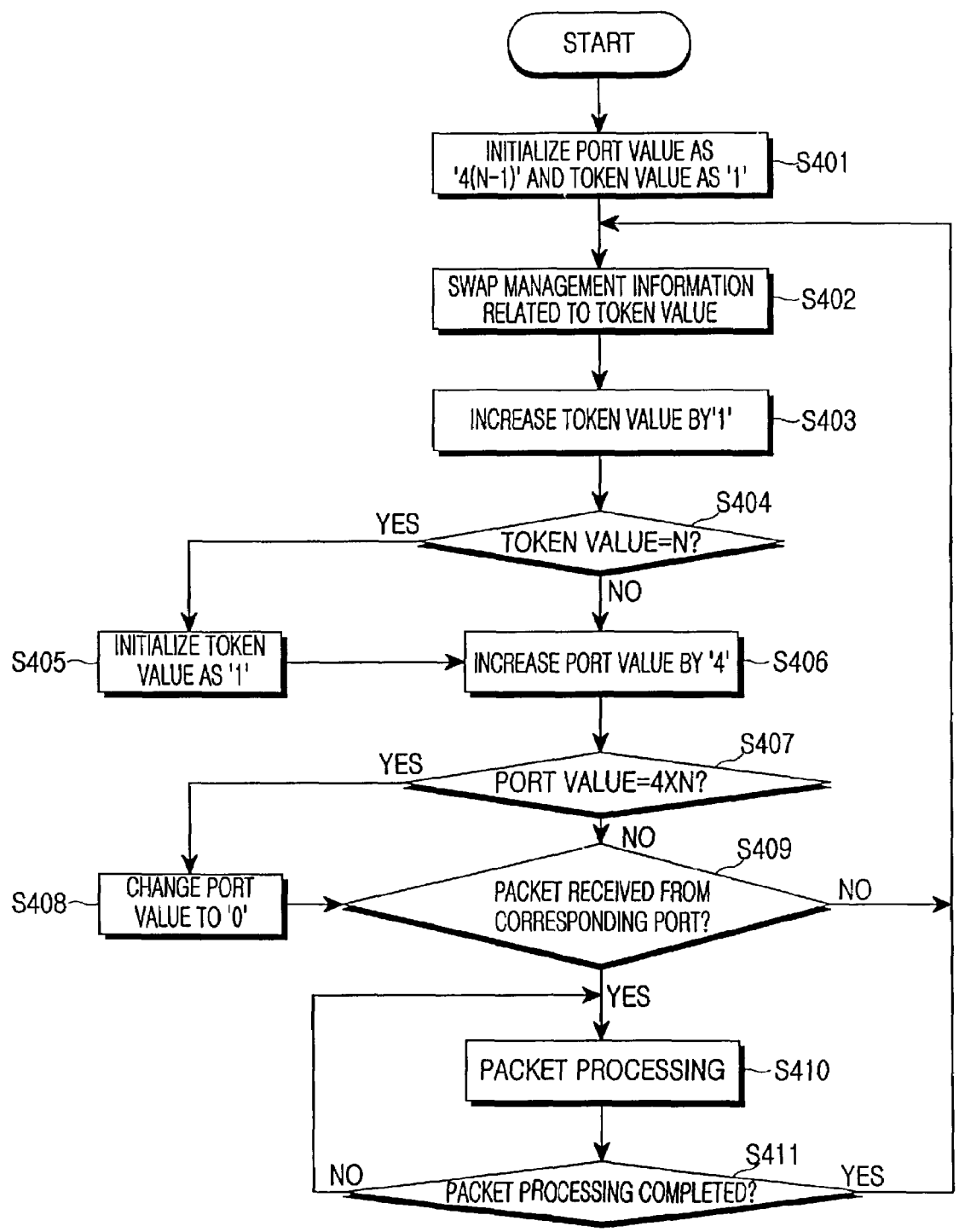
FIG. 4 is a flow chart illustrating a processing procedure performed at a first thread when 4×N number of ports are operated at four threads, in accordance with the principles of the present invention.

FIG. 4 is a flow chart illustrating a processing procedure made at each thread when 4×N number of ports are managed by four threads, in accordance with the principles of the present invention. Referring to FIG. 4, a thread initializes a port value as '4(N−1)' and initializes a token value as '1' at step S401. Management information determined by the port value is swapped with the management information (i.e., first management information) in a register determined by the token value at step S402, and then stored in the thread. After that, the token value in '1' at step S403.

If the token value is equal to N at step S404, the token value is initialized again as '1'at step S405 and the port value increases by '4' at step S406. If the token value is not equal to N at step S404, the token value is not changed and then the port value increases by '4' at step S406.

If the port value is equal to '4×N' at step S407, the port value is changed to '0', and then it is determined at step S409 whether a packet is received from a port corresponding to the port value '0'. If the port value is not equal to '4×N' at step S407, the port value is not changed and it is determined at step S409 whether a packet is received from a port corresponding to the port value. If the packet is not received from a corresponding port at step S409, a procedure returns to step S402. If the packet is received from a corresponding port at step S409, a procedure goes to step S410.

The thread processes a packet received from a port corresponding to the port value at step S410. The packet processing at step 410 may relate to L2 header processing or L3 header processing, for example. L2 header processing relates to Ethernet and a determination that a destination media access control (MAC) is consistent with an interface MAC in the case of processing L3 packet. L3 header processing relates to checking Internet protocol version 4 (IPv4) packet, transistor-transistor logic (TTL), IP header checksum, and more. If the packet processing has been completed at step S411, then a procedure returns to step S402.

As described above, a plurality of ports (e.g., P0, P4, P8 and P12) in FIG. 3 managed by one thread are sequentially accessed to process received packet, and management information of a port used for current packet processing is stored in a register indicated by a token. Herein, provided that the number of ports processed at each thread is determined as 'N', the token value counts the range from '1' to 'N−1' so that management information about a specific port is stored in different registers during every packet processing.

The aforementioned description can be implemented with a C-code program shown in FIG. 5. FIG. 5 is a view showing a C-code program 500 for implementing the processing procedure of FIG. 4, in accordance with the principles of the present invention. Referring to FIG. 5, as apparent from the above description, an algorithm made by a C-code program language does not need a specific register for storing management information related to a specific port. In other words, as token values are sequentially changed, registers used for storing management information related to a corresponding port are also changed. The following TABLE 2 represents the relationship between ports and management information when the number of ports is 4×4 (i.e., 16 ports).

TABLE 2

| Port | Token Value | Management Information |
|------|-------------|------------------------|
| P0   | 1           | portinfo_0, portinfo_1 |
| P4   | 2           | portinfo_2, portinfo_3 |
| P8   | 3           | portinfo_4, portinfo_5 |
| P12  | 1           | portinfo_0, portinfo_1 |
| P0   | 2           | portinfo_2, portinfo_3 |
| P4   | 3           | portinfo_4, portinfo_5 |
| P8   | 1           | portinfo_0, portinfo_1 |
| P12  | 2           | portinfo_2, portinfo_3 |
| P0   | 3           | portinfo_4, portinfo_5 |
| P4   | 1           | portinfo_0, portinfo_1 |

As apparent from the above description, the present invention automatically recognizes the type of user interfaces or a change of the number of user interface ports in a network processor, and supports various kinds of user interfaces fixed by hardware employing one microcode upon receiving the recognized result. That is, the present invention has an advantage in that it is applicable to various user interfaces or various ports without changing microcode.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A method for processing data received from various numbers of ports in a network processor, the method comprising:

receiving a number N corresponding to a number of ports;
allocating N−1 registers for storing N−1 items of port management data, the N−1 registers including a first register and a last register, the last register corresponding to (N−1)th register;
sequentially accessing the N ports to receive packets;
when a packet is received from a selected port selected from among the N ports, processing the packet received from the selected port; and storing current management data of the selected port in a selected one register selected from among the N−1 registers, the selected one register being used for storing next management data of a next port before storing current management data of the selected port, the next port being selected from among the N ports and being a port to be accessed after the selected port is accessed;

the selected one register being the first register when a previous register is the (N−1)th register, the previous register being currently used for storing previous management data of a previous port selected from among the N ports, and the previous port was accessed before the selected port was accessed.

2. The method of claim 1, the selected one register being selected by a token technique which sequentially manages a token value from '1' to 'N−1', each token value corresponding to a unique register from among said N−1 registers to store management data of the N ports.

3. A method for processing ports at one thread in a network processor having a plurality of threads for processing a packet, each thread processing packets received from at least one port, the method comprising:

allocating a plurality of registers for storing N−1 items of port management data, the plurality of registers corresponding to a number N−1 of registers, the N−1 registers including a first register and a last register, the last register corresponding to (N−1)th register, a number N corresponding to a number of ports processed at one thread;

sequentially accessing the N ports including a predetermined port selected from among the N ports;

processing a packet received from the predetermined port; and storing current management data in a selected one register selected from among the N−1 registers, the current management data corresponding to the predetermined port, the selected one register corresponding to a next port, the next port being selected from among the N ports and being the port accessed after the predetermined port is accessed;

the selected one register corresponding to the first register when a previous register corresponds to the (N−1)th register, the previous register being one of the N−1 registers, the previous register storing previous management data before said storing of the current management data.

4. The method of claim 3, the selected one register being selected by a token technique which sequentially manages a token value from '1' to 'N−1', each token value corresponding to a unique register from among said N−1 registers to store management data of the N ports.

5. A method for processing various numbers of ports in a network processor, the method comprising:

allocating a plurality of registers in dependence upon a number N of ports, the number of allocated registers being the number N−1;

sequentially accessing the N ports to process a packet;

receiving a packet from a predetermined port, the predetermined port being selected from among the N ports;

sequentially selecting a register from among the N−1 registers with a circulation technique that selects a first register of the N−−1 registers immediately after selection of a last register, the last register being the (N−1)th register; and storing management data corresponding to the predetermined port in the selected register.

6. The method of claim 5, the circulation technique corresponding to a token technique which sequentially manages a token value from '1' to 'N−1', each token value corresponding to a unique register from among said N−1 registers to store management data of the N ports.

7. The method of claim 5, further comprising determining the number N of ports.

8. The method of claim 5, said accessing of the N ports corresponding to accessing each of the N ports in accordance with a predetermined sequence.

9. The method of claim 8, the circulation technique corresponding to a token technique which sequentially manages a token value from '1' to 'N−1', each token value corresponding to a unique register from among said N−1 registers to store management data of the N ports.

10. The method of claim 9, further comprising determining the number N of ports.

11. The method of claim 10, the N−1 registers including a first register and a last register, the last register being the (N−1)th register, the selected register corresponding to the first register when previous management data corresponds to a previous port selected from among the N ports and the previous port was accessed before the predetermined port was accessed and the previous management data was stored in the (N−1)th register.

12. A method for processing varying numbers of ports in a network processor, the method comprising:

providing a plurality of registers for storing N−1 items of port management data, the plurality of registers corresponding to a number N−1 of registers, the N−1 registers including a first register and a last register, the last register corresponding to (N−1)th register, said providing being performed in dependence upon a number N corresponding to a number N of ports;

accessing the N ports to receive packets and processing a packet received from a selected port selected from among the N ports; and storing current management data in a selected one register selected from among the N−1 registers, the current management data corresponding to the predetermined port, the selected one register corresponding to a next port, the next port being selected from among the N ports and being the port accessed after the predetermined port is accessed.

13. The method of claim 12, said accessing corresponding to a sequential accessing in accordance with a predetermined algorithm.

* * * * *